(No Model.)
C. J. MEISSNER & F. KOENIG.
WINDOW GLASS CUTTER.
No. 599,620.                        Patented Feb. 22, 1898.
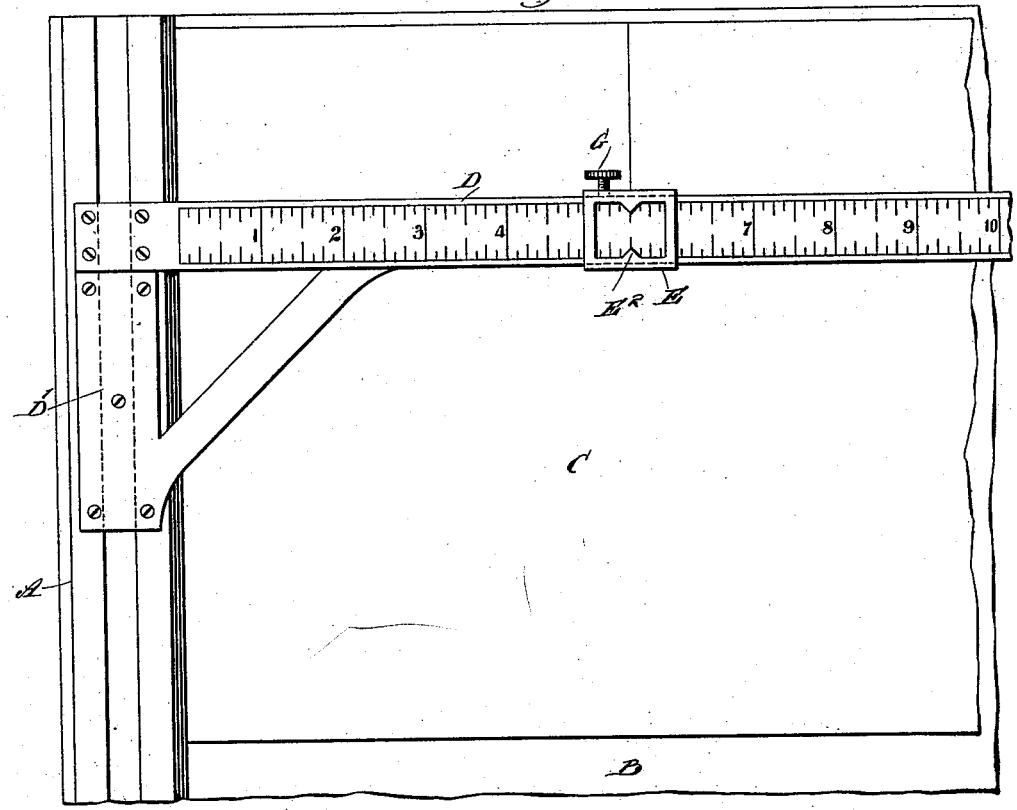
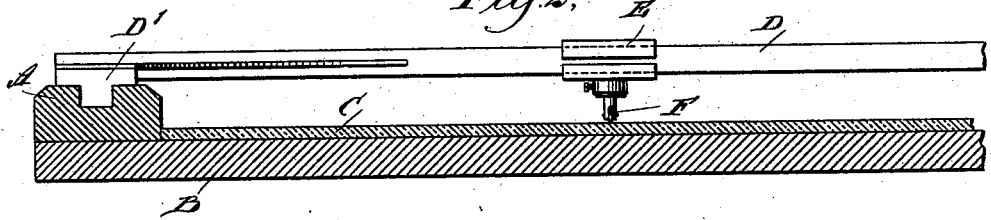
WITNESSES:
Edward Thorpe
INVENTORS
C. J. Meissner
F. Koenig
BY
ATTORNEYS.

UNITED STATES PATENT OFFICE.

CHARLES JOHN MEISSNER AND FRANÇOIS KOENIG, OF BOSTON, MASSACHUSETTS.

WINDOW-GLASS CUTTER.

SPECIFICATION forming part of Letters Patent No. 599,620, dated February 22, 1898.

Application filed April 2, 1897. Serial No. 630,391. (No model.)

*To all whom it may concern:*

Be it known that we, CHARLES JOHN MEISSNER and FRANÇOIS KOENIG, of South Boston, in the county of Suffolk and State of Massachusetts, have invented a new and Improved Window-Glass Cutter, of which the following is a full, clear, and exact description.

The object of the invention is to provide a new and improved window-glass cutter which is simple and durable in construction, easily manipulated, and arranged to cut the glass to accurate measurement.

The invention consists principally of a fixed guide, a graduated stick held movably on the said guide, and a holder adjustable on the said stick and adapted to be secured thereon.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in both figures.

Figure 1 is a plan view of the improvement as arranged for cutting rectangular window-panes. Fig. 2 is a sectional side elevation of the same.

The device, as illustrated in the drawings, is provided with a guide A, secured or formed on the top of a table B or other suitable support, on which the glass C is placed, resting with one edge against the side of the guide A, as indicated in the drawings. On the guide A is fitted to slide the head D' of a stick D, formed with a graduation preferably in inches and subdivisions and beginning from the inner edge of the guide A, as plainly shown in Fig. 1. On the stick D is fitted to slide the holder E, carrying on its under side a removable cutter F in the form of a diamond, steel disk, or the like, and adapted to cut the glass C by the operator moving the stick D, with its head D', longitudinally in the guide A, so as to move the cutter transversely over the glass. The holder E, after proper adjustment is made on the stick D according to the size of the glass to be cut, is secured in place by a suitable set-screw G or other means.

Now it will be seen that by the arrangement described a perfect parallel cut is made on the glass C to the edge resting against the guide A, it being understood that the cut portion of the glass is placed with its other edge against the guide for a second cut, if necessary.

The holder E is preferably provided on top with openings, into which project pointers $E^2$ for setting the holder accurately on the stick, the pointers being in alinement with the cutter F, so that an accurate cut is made.

It will further be seen that the cutter F is held in proper position relative to the glass C, as the stick D moves approximately in a horizontal plane parallel to the top surface of the glass.

By the arrangement described the operator is enabled to accurately cut a pane of glass without danger of breaking the glass, as is frequently the case when an ordinary yardstick is used, laid on the pane of glass, and a cutter run along one edge thereof.

The device is very simple and durable in construction, is portable, and can be readily set up at any place.

Having thus fully described our invention, we claim as new and desire to secure by Letters Patent—

1. A glass-cutter, comprising a bar having a groove in its upper surface parallel with a side edge, a bar having a transverse head at one end which has a rib making a close sliding fit in said groove and a cutter adjustable upon said bar.

2. A glass-cutter, comprising a bar having a scale marked upon its upper surface, a transverse head fixed to one end having a rib projecting from its under surface, a bar having a groove in its upper surface parallel with its side edge and forming a close sliding fit with said rib and a cutter-holder mounted to slide upon the bar and having an indicator, and means for locking the cutter upon the bar.

CHARLES JOHN MEISSNER.
FRANÇOIS KOENIG.

Witnesses:
HENRY CLEARY,
JOHN G. MEISSNER.